United States Patent [19]
Zulian

[11] Patent Number: 5,870,560
[45] Date of Patent: Feb. 9, 1999

[54] ARBITRAION UNIT WITH ROUND-ROBIN PRIORITY, PARTICULARLY FOR MULTIPROCESSOR SYSTEMS WITH SYNCRONOUS SYMMETRICAL PROCESSORS

[75] Inventor: Ferruccio Zulian, Cornaredo, Italy

[73] Assignee: Bull HN Information Systems Italia S.p.A., Torino, Italy

[21] Appl. No.: 771,766

[22] Filed: Dec. 20, 1996

[30] Foreign Application Priority Data

Dec. 29, 1995 [EP] European Pat. Off. ............ 95830560.9

[51] Int. Cl.$^6$ .................................................. G06F 13/37
[52] U.S. Cl. ............................... 395/200.55; 395/200.55; 395/732; 395/200.53; 395/200.59
[58] Field of Search ..................... 395/732, 729, 395/200.53, 297, 299, 728, 29, 675, 296, 200.55, 200.59; 340/825.5

[56] References Cited

U.S. PATENT DOCUMENTS

| | | | |
|---|---|---|---|
| 4,814,974 | 3/1989 | Narayanan et al. | 395/732 |
| 5,072,363 | 12/1991 | Gallagher | 395/729 |
| 5,202,999 | 4/1993 | Lenthall et al. | 395/732 |
| 5,280,580 | 1/1994 | Brooks et al. | 395/200.53 |
| 5,377,332 | 12/1994 | Entwistle et al. | 395/297 |
| 5,487,170 | 1/1996 | Bass et al. | 395/732 |
| 5,581,782 | 12/1996 | Sarangdhar et al. | 395/299 |
| 5,623,672 | 4/1997 | Popat | 395/728 |
| 5,640,519 | 6/1997 | Langendorf et al. | 395/291 |
| 5,655,120 | 8/1997 | Witte et al. | 395/675 |
| 5,689,656 | 11/1997 | Baden et al. | 395/296 |
| 5,710,549 | 1/1998 | Horst et al. | 340/825.5 |

FOREIGN PATENT DOCUMENTS

0 640 926 A1 3/1995 European Pat. Off. .
40 24 029 A1 1/1992 Germany .

*Primary Examiner*—Parshotam S. Lall
*Assistant Examiner*—Bau Trong Le
*Attorney, Agent, or Firm*—Finnegan, Henderson, Farabow, Garrett & Dunner, L.L.P.

[57] ABSTRACT

In a synchronous arbitration unit with round-robin priority for arbitrating between N requests (Ri) for access to common resources of a multiprocessor system, the requests stored in an input register timed by a clock signal are applied as inputs to a fixed-priority arbitration network having 2N−1 inputs, N−1 of the requests being applied both to a first set of N−1 lower-priority inputs of the network and, through masking circuits which selectively mask the requests with a binary masking configuration generated by mask-generating circuits in accordance with predetermined priority-rotation criteria, to a second set of N−1 higher-priority inputs of the network, in the same order of input priority. The grant signals output by the network are latched in an output register after logical OR of the grant signals associated with the same request and the arbitration unit thus formed has a minimal arbitration time and is constituted by a small number of logic components.

12 Claims, 5 Drawing Sheets

ARBITRAION UNIT WITH ROUND-ROBIN PRIORITY, PARTICULARLY FOR MULTIPROCESSOR SYSTEMS WITH SYNCRONOUS SYMMETRICAL PROCESSORS

An arbitration unit with round-robin priority, particularly for multiprocessor systems with synchronous symmetrical processors.

FIELD OF THE INVENTION

The present invention relates to a fast synchronous arbitration unit for multiprocessor systems with symmetrical processors in which several processors may simultaneously request access to common system resources such as a system bus and a shared memory.

BACKGROUND

In multiprocessor systems with symmetrical processors in which no processors are given priority according to a predetermined hierarchy but all of the processors have equal rights of access to common resources (and are therefore defined as symmetrical), the problem of arbitrating between concurrent requests for access to common resources constitutes a severe problem, particularly with technological developments which require the use of ever quicker arbitration mechanisms which can operate in very short time intervals of about ten ns.

The arbitration mechanisms in synchronous systems are very simple; in a time interval defined by a periodic clock signal, each of the various processors which wish to obtain access to common resources has to assert a signal requesting access to the common resources on a connection wire (one per processor) to an arbitration unit.

At the end of the time interval, the various requests for access are loaded in an input register of the arbitration unit which, in an immediately subsequent time interval, determines, on the basis of predetermined arbitration criteria, to which of the processors to grant access to the common resources, and asserts a consent or GRANT signal associated with the arbitration carried out.

At the end of the arbitration time interval, this signal is loaded in an output register and is sent to the processor to which access has been granted.

This processor must deassert its request for access at the correct time (or keep it asserted if access to the common resources is required again) to allow a new arbitration operation to start.

There are various arbitration criteria of which, however, only that known as "round-robin" or circular-priority arbitration satisfies the requirements of multiprocessors with symmetrical processors, since all of the requests for access are satisfied without exclusions and without preference and, on average, the processors are served equally.

Whereas the fixed-priority arbitration criterion assigns to each processor a predetermined invariable priority relative to the other processors, the "round robin" arbitration criterion assigns a predetermined cyclic order but not an invariable relative priority to the various processors during access to common resources.

This order may be compared to a conventional or initial priority which is assigned in order to carry out a first arbitration operation on the basis of the relative priority thus assigned.

The relative priority of the processors is not fixed, however; if each of N processors is initially assigned a relative priority rank K, where K is between 1 and N, the priorities K decreasing from N to 1, and, in the case of a first arbitration operation, a request for access of rank K which may be other than N is served, the next arbitration is carried out by the assignation to the various processors of an order of decreasing priority from K-1 to 1, followed in order by the processors N to K, in decreasing order of priority.

Similarly, in all of the subsequent arbitration operations, the highest priority is assigned to the processor K-1 which is next in order to the processor K served in the immediately preceding arbitration operation.

In other words, the processors are assigned a cyclic order and a circular-priority pointer or round-robin pointer RRP which progresses cyclically, according to the arbitration carried out previously, identifies, at any particular time, which processor should be considered to have greatest priority and consequently the relative priorities of the other processors.

This criterion of progression of the RRP pointer may be defined as "skipping" or jumping and, although preferable, is not the only one which can be used to satisfy a circular-priority arbitration criterion.

For example, pseudo-random and "conventional" round-robin progression criteria are also known and used.

With the pseudo-random progression criterion, the RRP pointer is rotated by one or more positions in the cyclic order for each period of a clock signal (or for each predetermined multiple of the period of a clock signal).

The conventional round-robin progression criterion differs from the previous one solely in that the RRP pointer is rotated by one or more positions in the cyclic order for each grant of access.

Whereas a fixed-priority arbitration unit is quite easy to implement and is particularly fast since it is formed by an arbitration network in which the logic chains are constituted, theoretically, by only two logic elements in cascade (or three if the masking logic circuits generally included in an arbitration unit as discussed below are considered) circular (round-robin) priority arbitration networks are particularly complex, require a large number of logic components, and are therefore expensive.

Moreover, they necessarily require the formation of logic chains with at least 6 logic elements in cascade (7 if the masking circuits are considered) and are also intrinsically slower because the output load of several logic elements is much greater than is the case with fixed-priority arbitration networks.

There is also a known circuit embodiment which is formed in practice by a plurality of fixed-priority arbitration networks the outputs of which are applied as inputs to multiplexers, which theoretically reduces the lengths of the logic chains to 4 elements in cascade (5 if the masking circuits are considered) but requires a larger overall number of logic elements and considerably increases the input load of the network.

In the embodiments of the prior art, for a given circuit technology and number of input signals to be arbitrated, a circular-priority arbitration network thus has a propagation time of more than twice the propagation time of a fixed-priority arbitration network and cannot be reconciled with the operation of modern microprocessors which operate at frequencies of the order of 100 MHz and, to avoid a decline in their performance, require arbitration operations to be executed in very short times of the order of about ten ns.

SUMMARY OF THE INVENTION

The present invention remedies this limitation and provides a circular-priority arbitration unit with a smaller number of logic elements which is therefore particularly easy to produce even in the form of an integrated circuit and which, in combination with this advantage, also benefits from having an extremely short propagation time brought about by logic chains with only four logic elements in cascade.

Moreover, in the particular case of arbitration systems with hierarchical priority levels, that is, in which several arbitration networks each have to arbitrate between access requests belonging to the same hierarchical level and the results of the arbitration of each necessarily have to be applied to OR logic gates, the output logic element of the logic chains performs this function without the need for further elements or increases in propagation times.

These results are achieved by an arbitration unit which comprises essentially a conventional fixed-priority arbitration network.

If N is the number of separate requests to be arbitrated, the network is provided with 2N−1 inputs for receiving and arbitrating between 2N−1 signals.

The network itself assigns to each of the inputs and to the signal applied thereto an ordered and invariable priority K (where 2N>K>0) relative to the other inputs.

The network inputs comprise a first set of N−1 lower-priority inputs, a second set of N−1 higher-priority inputs, and an input of priority K=N which is intermediate those of the first and second sets.

Each of the N requests for arbitration is applied to an input of the first set and to the intermediate priority input.

Moreover, the same N−1 requests to be arbitrated which are applied as inputs to the first set are also applied as inputs to the second set, each being applied to an input of the second set in the same order of relative priority of the inputs, through masking circuits which enable the requests (more precisely their asserted status) applied to the second set of inputs to be masked.

Each network input K is associated with a network output at which a grant signal is affirmed only if the signal applied to the associated input is affirmed and if the signals applied to the inputs with higher priority, that is, greater than K, are all deasserted.

Clearly, therefore, by selectively masking the requests applied to the second set of higher-priority inputs, it is possible to rotate the relative priority which the arbitration network assigns to the various requests without excluding any of the requests from the arbitration.

In fact, the requests which are applied to the inputs of the second set and which are masked are taken into consideration as requests to which a lower priority is assigned in a cyclic order since the same, non-masked requests, are also applied to the inputs of the first set.

The output pairs of the arbitration network associated with input pairs to which the same request, which may be masked at the higher-priority input, is applied, are applied to OR logic gates.

The arbitration unit is completed by an input holding register and an output holding register which are timed by periodic clock signals, and by circuits for generating a binary round-robin mask configuration (or simply a mask) which is made to progress according to one of the various possible criteria already mentioned.

The arbitration unit can advantageously also be used to form arbitration units with several hierarchical levels of arbitration.

BRIEF DESCRIPTION OF THE DRAWINGS

The characteristics and the advantages of the invention will become clearer from the following description of a preferred embodiment of the invention and from the appended drawings, in which.

DETAILED DESCRIPTION

Figure 1:
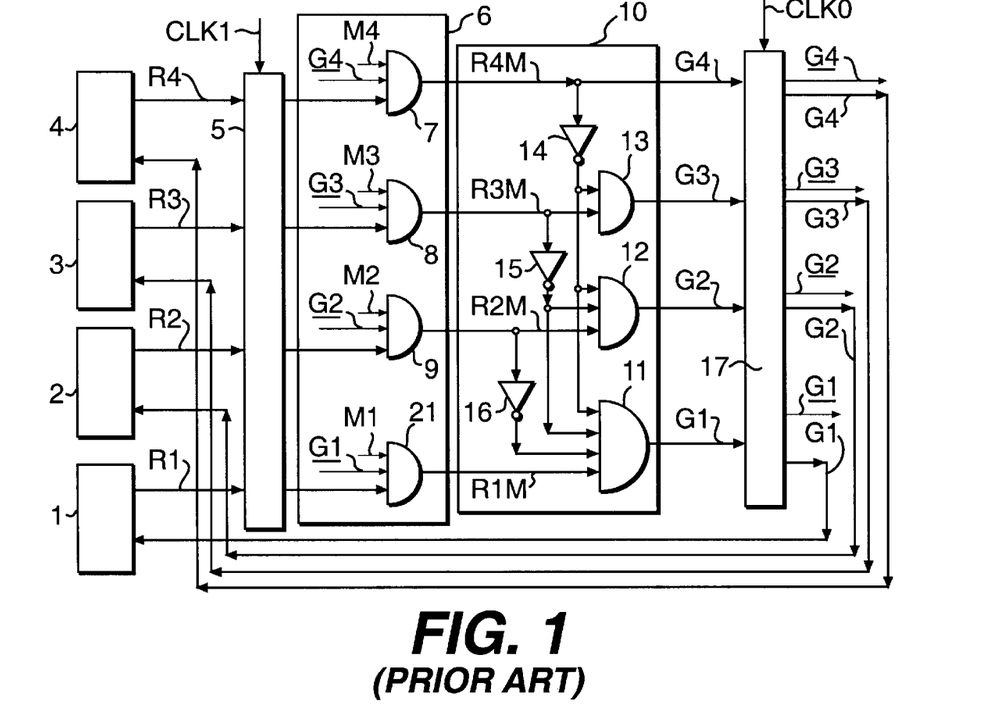
FIG. 1 shows, by way of example, a fixed-priority arbitration unit of the prior art.

For a better understanding of the invention, it is appropriate first of all to consider a conventional, fixed-priority arbitration unit of the prior art, shown, by way of example, in FIG. 1, in which each of N=4 processors or, more generally, requesting units 1, 2, 3, 4 generates a respective signal R1, R2, R3, R4 requesting access to common resources.

The requests for access, referred to below as "requests" are assigned a predetermined fixed relative priority increasing, for example from R1 to R4.

The requests are periodically loaded in an input register 5 by a clock signal CLK1 which defines an arbitration period in the course of which the requests have to be arbitrated and an access grant signal has to be generated to the requesting unit with highest priority.

This signal has to be loaded in an output register 17 by the immediately following clock signal CLK1 in order to be sent to the requesting unit with highest priority, so that its request can be cancelled within the next period of the clock signal CLK1.

The use of the clock signal CLK1 to time both input and output registers involves the need, as will be seen, to mask the request served by the arbitration unit to prevent it from being recognized and served on two consecutive occasions.

The mask which performs this function can be defined as an "auto-mask" to distinguish it from other masks with different functions.

Moreover, if, after a grant, the period of possession or "tenure" of the common resources is longer than the period of the clock signal CLK1, it is necessary to adjust the period of the arbitrations to the tenure of resources to prevent access being granted at a frequency greater than that permitted by the tenure of resources.

This is generally achieved by the masking of all of the requests for access throughout the necessary time, that is, for one or more periods of the clock signal, with a mask which can be defined as a "collective mask".

To avoid the need for masking with an auto-mask and/or collective mask, it is also possible to use two separate clock signals CLK1 and CLK0 for timing the input and output registers, respectively.

In this case, the signals CLK1 and CLK0 of equal period have a suitable phase difference and the arbitration time available to the arbitration unit is defined by the delay of the signal CLK0 relative to CLK1. The periods of the two signals have to be equal to or greater than the tenure of resources and the advance of CLK0 relative to CLK1 has to be equal to or greater than the time needed to deassert the request served.

It is also possible to use synchronous clock signals with different periods, the period of CLK1 being a multiple of CLK0.

Naturally, the period of CLK1 has to be longer than the arbitration time and the period of CLK0 has to be equal to or longer than the tenure of resources and than the sum of the times necessary to carry out an arbitration and deassert the request served.

Fixed-priority arbitration units generally have masking logic circuits 6 constituted essentially by N (4 in the example of FIG. 1) AND logic gates 7, 8, 9, 21 which enable the assertion of the various requests output by the input register to be masked selectively with a binary masking configuration M1, M2, M3, M4.

In general, the ability to mask the requests selectively upon the command of a supervisor (in addition to an auto-mask and/or a collective mask for timing problems, in the case considered above) is convenient for preventing one or more of the requesting units with higher priority monopolizing access to the common resources at the expense of the units with lower priority.

For this function, the masking AND gate 21 associated with the request of lowest priority 21 may be superfluous.

The masked requests R4M, R3M, R2M, R1M (in the sense of those which are maskable) output by the masking logic circuits 6 (R1M may be replaced by the non-masked request of lowest priority output by the register 5) are input to a conventional arbitration network 10 which, in the example of FIG. 1, comprises three AND logic gates 11, 12, 13 and three inverters (NOT gates) 14, 15, 16).

The lowest-priority request R1M is applied as an input to the AND gate 11 together with the maskable requests R4M, R3M, R2M, previously inverted by the NOT gates 14, 15, 16.

A grant signal G1 is available at the output of the AND gate 11 in the asserted state only if R1M is asserted and all of the maskable higher-priority requests are deasserted (because of the masking signal or because they are intrinsically deasserted).

Similarly, the maskable intermediate-priority requests R2M, R3M, are applied as inputs to the AND gates 12, 13, respectively, together with the maskable requests of higher relative priority, previously inverted.

There are respective asserted grant signals G2, G3 at the outputs of the AND gates 12, 13 only if R2M and R3M, respectively, are asserted and all of the higher-priority maskable requests are deasserted.

The higher-priority maskable request R4M is transferred directly to the output of the arbitration network and constitutes an asserted grant signal G4 if R4M is asserted.

The signals output by the network 10 are loaded in an output register 17 timed by a clock signal CLK0 and are sent from there to the respective requesting units 1, 2, 3, 4.

As already stated, the signal CLK0 may be synchronous with CLK1 and its frequency may be the same as, or a multiple of, that of CLK1.

If CLK1 and CLK0 have the same frequency, the negated signals G4, G3, G2, G1, output by the register 17 (or the signals G4, G3, G2, G1 if the asserted logic level of these signals corresponds to the electrical level zero) are conveniently applied as inputs as auto-mask signals to the AND gates 7, 8, 9, 21, respectively.

Here and below, for convenience, the underlining of the name of a signal or of a signal output indicates the negation symbol.

It can readily be seen that the most critical logic chain of the arbitration unit is constituted by the AND gate 9, by the NOT gate 16 and by the AND gate 11, that is, by three logic elements in cascade, and that the AND gate 11 is that which has the largest number of inputs and hence requires a larger "fan-in".

There are therefore no difficulties in forming, by modern electronics technology in which the logic elements typically have propagation times equal to or less than 2 ns, an arbitration unit which can operate with an arbitration time of 10 ns, corresponding to a clock frequency CLK0=100 MHz.

Figure 2:
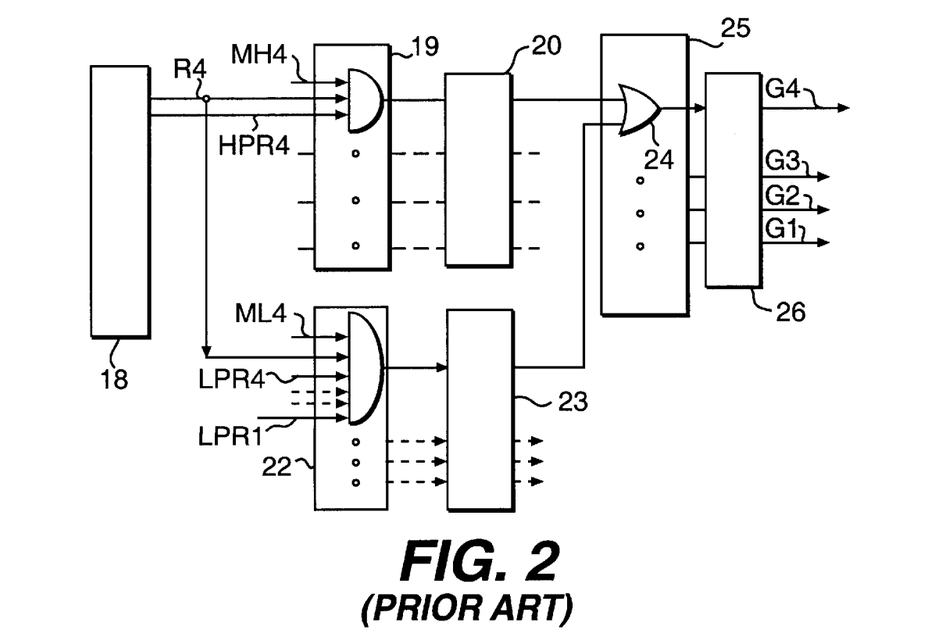
FIG. 2 shows, by way of example, a fixed-priority arbitration unit with two hierarchical levels of arbitration of the prior art.

There is also a margin for forming arbitration units with several hierarchical arbitration levels of known type, an example of which is shown schematically in FIG. 2.

In FIG. 2, an input register 18 timed by the clock signal CLK1 periodically loads N, for example 4, requests only one R4 of which is shown, together with signals HPRi/LPRi each of which accompanies a request and characterizes it as a request with HIGH priority (HPRi/LPRi asserted) or with LOW priority (HPRi/LPRi deasserted).

Since the input resister is constituted by flip-flops, clearly either a signal HPRi or its negation LPRi can be made available at its output, at the outputs Q and Q of the various flip-flops.

The requests output by the register 18 are applied as inputs to a first high-priority masking circuit 19 just like that of FIG. 1, in which each of the various AND gates receives as an input a request, for example R4, the associated high-priority signal HPR4 and a masking signal MH4.

The outputs of the masking circuit 19 are connected to the inputs of a fixed-priority arbitration network 20 identical to the network 10 of FIG. 1.

The requests output by the register 18 are also applied as inputs to a second, low-priority masking circuit 22 just like that of FIG. 1, in which each of the various AND gates receives one of the various requests, for example R4, the associated low-priority masking signal ML4, and all of the low-priority signals LPR4, LPR3, LPR2, LPR1 (if necessary in an OR arrangement with the respective high-priority masking signals) associated with the various requests.

The latter ensure that, even in the presence of only one high-priority request, any low-priority request is masked.

The outputs of the masking circuits 22 are connected to the inputs of a fixed-priority arbitration network 23 identical to the network 10 of FIG. 1.

Finally, each of the pairs of access grant signals which are associated, respectively, with requests of equal relative priority in the two arbitration levels and which are output by the networks 20, 23 (for example, HG4, LG4) is applied as an input to an OR logic Gate (such as 24) of a set 25 of N logic gates, the outputs of which are connected to the inputs of an output register 26.

In this case, the logic chain for the propagation of the input register signals to the output register comprises at least four logic elements in cascade.

With reference to FIGS. 1 and 2, it can also be seen that the number of logic elements necessary to form the arbitration networks such as 10, 20, 23 is equal to 2(N−1) hence 6 if N=4.

The situation in terms of circuit complexity and propagation time is much more awkward in the formation of arbitration networks with circular priority.

Figure 3:
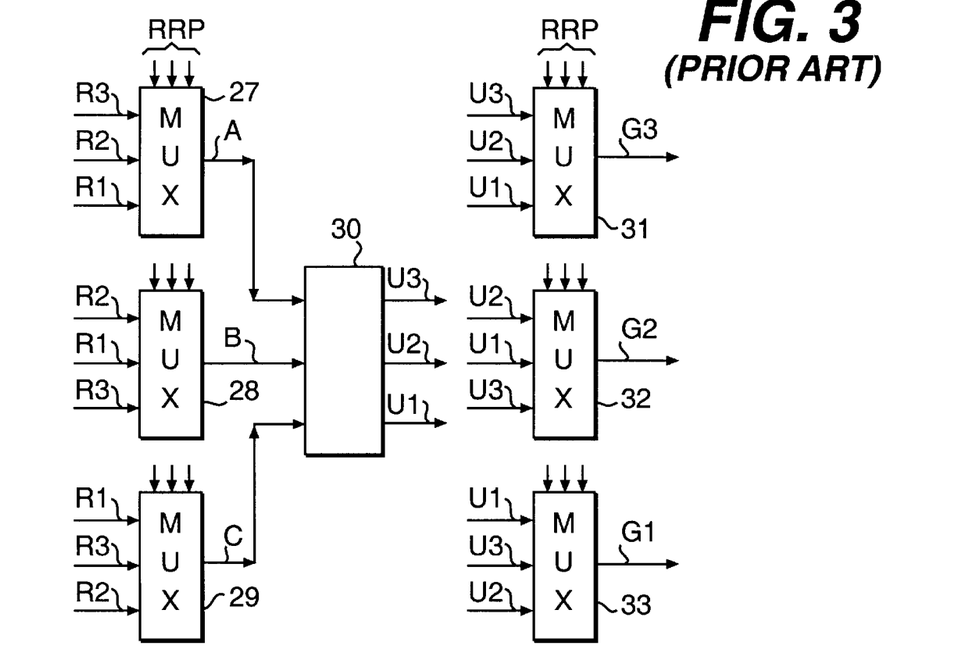
FIG. 3 shows, by way of example, a first embodiment of a circular-priority arbitration unit of the prior art.
Figure 4:
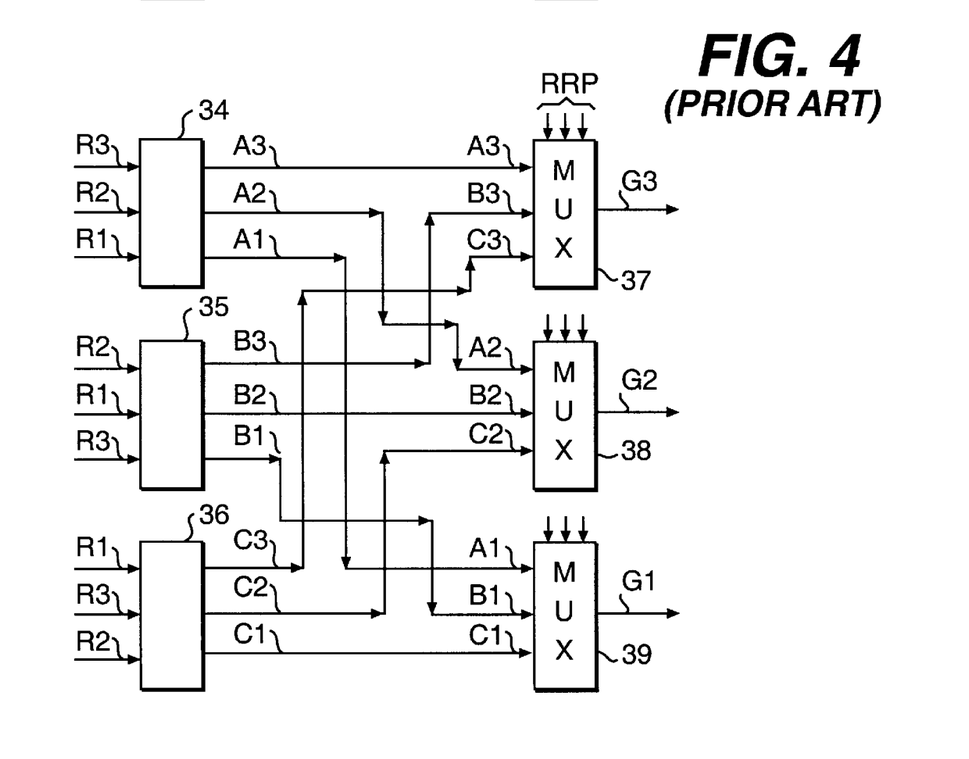
FIG. 4 shows, by way of example, a second embodiment of a circular-priority arbitration unit of the prior art.

The prior art offers two solutions, shown in FIGS. 3 and 4, in which, for descriptive simplicity, the number N of requests is 3 and the input-output registers and the masking circuits are not taken into consideration.

In the embodiment of FIG. 3, the requests for access R3, R2, R1, possibly masked by masking logic circuits, are applied as inputs to N (N=3) multiplexers 27, 28, 29 with N inputs with a relative rotation of the signals R3, R2, R1, from multiplexer to multiplexer.

The multiplexers are controlled by RRP input-selection signals generated by selection circuits, not shown, in accordance with the progression criteria already mentioned, for example, in dependence on the result of the immediately preceding arbitration carried out.

The RRP or "round robin pointer" signals constitute cyclic pointers which progress over time and define which of the requests, in the cyclic order assigned to the various requests, has the highest priority in the various time periods.

The outputs A, B, C, of the multiplexers are connected to the inputs of a fixed-priority arbitration network 30, which is just like the network 10 of FIG. 1 and the outputs U3, U2, U1 of which are connected to the inputs of N=3 multiplexers 31, 32, 33 with relative rotation from multiplexer to multiplexer.

The multiplexers 31, 32, 33 are also controlled by the RRP signals.

Clearly, the RRP signals bring about a rotation of the signals applied to the arbitration network 30 which carries out a fixed-priority arbitration on input signals the relative priority of which is rotated over time.

The output multiplexers 31, 32, 33 carry out a reverse rotation of the signals output from the arbitration network in order to re-assign them as grant signals G3, G2, G1 to the respective requests R3, R2, R1.

Since a multiplexer is formed by logic chains which comprise at least one AND gate and one OR gate in cascade, clearly an arbitration unit such as that of FIG. 3 is constituted by logic chains with at least six elements in cascade, to which the AND logic element of the masking circuits must be added.

In addition to this problem there is the problem that the loads of the input circuits and of the arbitration network are very high; in fact the circuits generating the signals R3, R2, R1, whether they are an input register or masking logic circuits, have to supply loads constituted by N inputs of N multiplexers and the network 31 also has to supply a load constituted by N inputs of N multiplexers, with heavy implications on propagation times.

Moreover, the circuit complexity is greater, 2N(N+1) logic elements theoretically being required to form the multiplexers and 2(N−1) logic elements to form the fixed-priority arbitration network, making a total of $2N^2+4N-2$ elements.

For example, if N=10, 238 elements are required.

To these it is necessary to add N logic elements for the masking circuits and logic elements for generating RRP pointer signals in dependence on the grant signals G3, G2, G1.

Incidentally, these pointer-signal generating circuits which are necessarily connected downstream of the multiplexers 31, 32, 33, if not downstream of the output register of the arbitration unit, introduce delays which increase the arbitration period.

A second embodiment of the prior art which reduces the propagation time of the arbitration unit to a certain extent is shown in FIG. 4.

In this case also, by way of example, N=3 and, for economy of description, the input and output registers and any masking circuits have not been shown.

In FIG. 4, the requests for access R3, R2, R1 are applied as inputs, with rotation of the inputs, to three fixed-priority arbitration networks 34, 35, 36.

The outputs Ai (i=3, 2, 1), Bi, Ci of equal priority of the various arbitration networks are connected to the respective inputs of N=3 multiplexers 37, 38, 39, at the outputs of which there are respective access grant signals G3, G2, G1.

The multiplexers are controlled by RRP selection signals defined in dependence on the immediately preceding arbitration.

In this case, the arbitration unit is constituted by logic chains which comprise four logic elements in cascade, possibly with the addition of an AND logic element of input masking circuits.

The propagation times are therefore shorter than those of a unit such as that of FIG. 3, but nevertheless longer than those of a fixed-priority arbitration unit.

Moreover, the load of the input circuits is high, as is the circuit complexity.

In order to produce the arbitration networks and the multiplexers, in fact 2N(N−1)+N(N+1), that is $3N^2-N$ logic elements are required, to which must be added N logic elements of the masking circuits and logic elements for generating the RRP pointer signals.

For example, if N=10, 290 logic elements are required.

Figure 5:
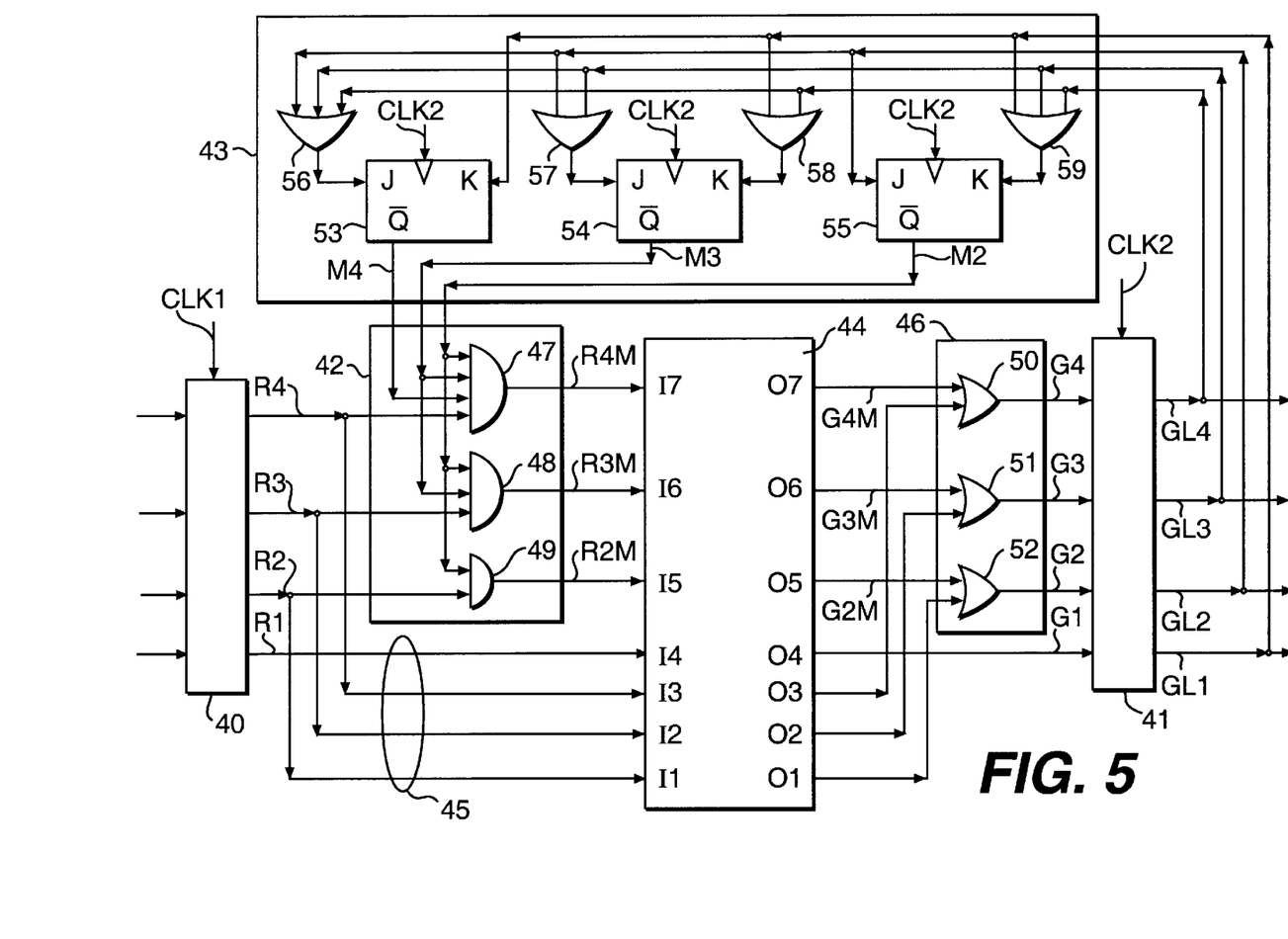
FIG. 5 shows a preferred embodiment of a circular-priority arbitration unit according to the present invention.

All of these limitations are overcome according to the invention by the synchronous, circular-priority arbitration unit shown in FIG. 5 in which, by way of example, the number N of requests arbitrated is 4.

The arbitration unit comprises essentially the following functional blocks:

an input holding register 40,
an output holding register 41,
masking logic circuits 42,
mask-generating logic circuits 43,
a conventional fixed-priority arbitration network 44 having 2N−1=7 inputs I1, . . . I7 for receiving 7 signals, to each of which the arbitration network assigns an ordered and invariable priority increasing from 1 to 7, relative to the other inputs,
a set 46 of OR logic gates for the connection in an OR arrangement of pairs of signals output by the arbitration network.

In FIG. 5, the access requests R4, R3, R2, R1 which are assigned initial or conventional relative priorities which increase from R1 to R4 and which have to be rotated by round-robin criteria, for example, in dependence on the preceding arbitrations, are stabilized in the input register 40 by a clock signal CLK1.

The requests R4, R3, R2 output by the input register 40 are applied, respectively, to the lower-priority inputs I3, I2, I1 of the priority network 44 by means of connection wires 45. The inputs I3, I2, I1 constitute a first set of lower-priority inputs of the arbitration network.

The same requests R4, R3, R2 are applied to the inputs of the masking logic circuits 42.

These comprise 3 AND gates 47, 48, 49, each of which receives as inputs a respective request R4, R3, R2 and suitable masking signals.

At the outputs of the AND gates 47, 48, 49, which constitute the outputs of the masking circuits 42, maskable request signals R4M, R3M, R2M are available, their asserted states being masked selectively in dependence on the masking signals. These define a binary masking configuration code M4, M3, M2 generated by the circuits 43 described below.

Each of the maskable requests R4M, R3M, R2M is applied to
a respective higher-priority input I7, I6, I5 of the arbitration network 44 in the same order in which the corresponding non-masked requests R4, R3, R2 are applied to the first set of inputs.

The inputs I7, I6, I5 constitute a second set of N−1 higher-priority inputs of the arbitration network.

The request R1 output by the register 40 is applied by means of one of the connection wires 45 as an input to the input I4 of the arbitration network which has a priority intermediate those of the first and second sets of inputs.

Each input I1, . . . I7 of the arbitration network 44 is associated with a respective output O1, . . . O7.

The fixed-priority arbitration network 44, the structure of which is known and is similar to that of the network 10 of FIG. 1, arbitrates between the various signals applied as inputs and outputs an asserted grant signal at one of the outputs oi only if an asserted request signal is present at the associated input Ii and if a deasserted signal is applied to all of the higher-priority inputs Ik (k>i).

Clearly, therefore, by suitable masking (with the masking circuits 42) of the asserted states of the signals R4M, R3M, R2M applied to the inputs I7, I6, I5, it is possible to change the relative priorities which the arbitration network assigns to the requests R4, R3, R2, R1.

For example, if the masking circuits 42 do not mask any request (hence R4=R4M, R3=R3M, R2=R2M) the arbitration network will arbitrate between the requests, assigning thereto a relative priority in decreasing order R4, R3, R2, R1.

If the masking circuits mask the request R4 (hence R4M is forcibly deasserted) the relative priority which is assigned is R3, R2, R1, R4.

In fact it will be noted that the request R4 is not ignored but, since it is applied to the input I3, is in any case taken into consideration and is assigned a priority immediately below that of the request R1 which is applied to the input I4.

Similarly, if the masking circuits 42 mask the requests R4 and R3, the relative priority which is assigned to the various requests is R2, R1, R4, R3.

Finally, if all of the requests R4, R3, R2 applied to the second set of inputs are masked, the relative priority assigned to the various requests is R1, R4, R3, R2.

It will therefore be noted that, in dependence on the masked states of the maskable requests R4M, R3M, R2M output by the masking circuits 42, the arbitration network 44 can affirm a grant signal in response to a generic request Ri (where i>1) to which the highest priority is attributed, on one of two outputs both associated with the same input request.

In particular, an asserted grant signal in response to an asserted request R4 may be present at the output O7 if the request R4M is not masked and at the output O3 if R4M is masked.

For this reason, the pair of outputs O3, O7 of which both are associated with the same request R4 is connected to the inputs of an OR gate 50 of the set of OR gates 46.

Similarly, the pair of outputs O2 and O6 of which both are associated with the same request R3 is connected to the inputs of an OR gate 51 of the set 46 and the pair of outputs O1 and O5 is connected to the inputs of an OR gate 52.

The outputs of the OR gates 50, 51, 52 and the output O4 of the network 44 associated with the input I4 are connected to the inputs of the output register 41 which loads the grant signals present at its inputs under the control of a periodic clock signal CLK2 and presents them at its output as latched grant signals GL4, GL3, GL2, GL1.

Only one GLi of these signals at a time can be asserted in the course of a period of the clock signal CLK2, in response to a request Ri arbitrated as having highest priority.

As well as being sent to the respective requesting units, the signals GLi are applied as inputs to the mask-generating circuits 43 which are arranged, for example, to cause the priority to progress by the round-robin skipping criterion already described.

These comprise essentially N−1=3 JK flip-flops 53, 54, 55 timed by the clock signal CLK2 and 2N−4 OR gates 56, 57, 58, 59 the outputs of which are connected, respectively to the input J of the flip-flop 53 (OR gate 56), to the input J of the flip-flop 54 (OR gate 57), to the input K of the flip-flop 54 (OR gate 58) and to the input K of the flip-flop 55 (OR gate 59).

When the signal GL4 applied as an input to the OR gates 56, 58, 59 is asserted, CLK2 sets the flip-flop 53 and resets the flip-flops 54, 55.

If the signal GL3 applied as an input to the OR gates 56, 57, 59 is asserted CLK2 sets the flip-flops 53 and 54 and resets the flip-flop 55.

If the signal GL2 applied as an input to the OR gates 56 and 57 and to the input J of the flip-flop 55 is asserted, CLK2 sets all of the flip-flops 53, 54, 55.

Finally, if the signal GL1 applied to the input K of the flip-flop 53 and to an input of the OR gates 58, 59 is asserted, CLK2 sets all of the flip-flops 53, 54, 55.

Respective deasserted masking signals M4, M3, M2 are available at the negated outputs of the flip-flops 53, 54, 55 when they are set.

The masking signals M4, M3, M2 are applied directly as inputs to the masking circuits 42 as shown in FIG. 5, and are applied as inputs to the AND gate 47 (signal M4), to the AND gates 47 and 48 (signal M3), and to the AND gates 47, 48, 49 (signal M2), respectively.

Clearly, if, in the course of an arbitration, a signal GLi where i>1 is asserted, deasserted masking signals are generated which, in the course of a subsequent arbitration, mask all of the requests RjM of a cyclic order equal to or greater than i which are applied to the second set of inputs of the arbitration network 44.

The arbitration network 44 will consequently arbitrate between the possible requests, assigning the greatest priority to the request R(i−1).

As a result of this subsequent arbitration, the result of which is again loaded in the output register 41, the state of the mask-generating circuits is updated and a new masking configuration is generated which assigns the highest priority to the request for access of a rank immediately below that already served.

It should be noted that if, in the course of an arbitration no grant signal is asserted since no request loaded in the input register was asserted, the state of the masking circuits and the respective mask generated are not changed.

If, on the other hand, as a result of an arbitration, the grant signal GL1 is asserted in response to the request R1, it can readily be seen that the flip-flops 53, 54, 55 are reset and the mask is completely removed.

The relative priorities assigned to the various requests are thus continuously updated and rotated upon each grant of access resulting from an arbitration carried out.

These results are achieved by an arbitration unit comprising a single arbitration network with fixed priority, masking circuits which are in any case necessary for other purposes, and a set of OR gates downstream of the arbitration network. Unlike embodiments of the prior art, it is constituted by very short logic chains with only four logic elements between the input register and the output register.

Moreover, the number of logic elements necessary to implement it is extremely small.

In fact it can be seen that, since the output O3 of the network is connected in an OR arrangement with the output O7, it is not necessary to subordinate the assertion of the output signal O3 to the deassertion of all of the signals applied to the inputs of higher priority, but only to the signals applied to the inputs I6, I5, I4.

Similarly, the assertion of a signal at the output O2 can be subordinated solely to the deassertion of the signals applied to the inputs I5, I4, I3 and the assertion of a signal at the output O1 can be subordinated solely to the deassertion of the signals applied to the inputs I4, I3, I2.

It can thus easily be seen that the arbitration network 44 can be formed with 2N–2 (6 in the example) NOT elements and 2N–2 AND gates with a maximum number of inputs N=4.

The number of logic elements necessary to form the arbitration network is therefore 4(N–1) (5(N–1) if the output OR gates are also considered) where N is the number of requests to be arbitrated.

Thus, if N=10, 45 logic elements suffice compared with the 238, 290 of the prior art.

Moreover, the maximum fan-in of the logic gates is equal to N and does not exceed that of a fixed-priority arbitration network for arbitration between N requests.

Figure 6:
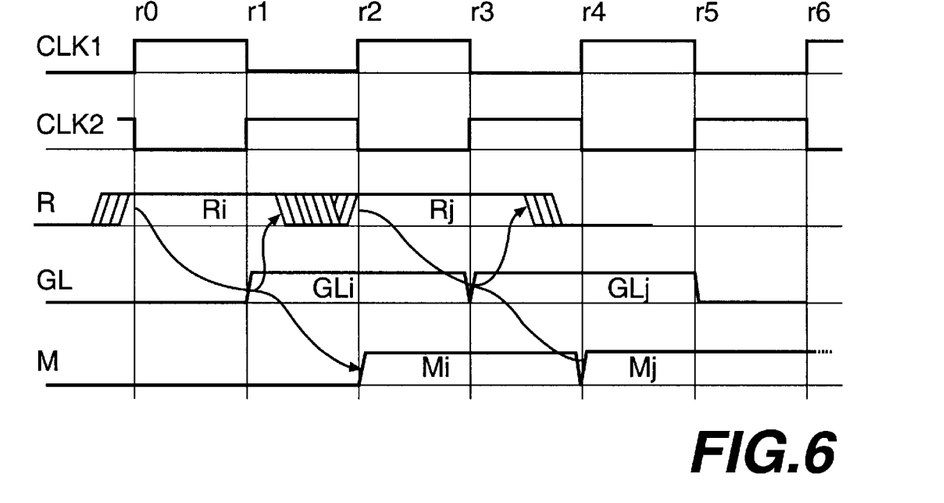
FIG. 6 shows the operation of the arbitration unit of FIG. 4 in a time graph.

FIG. 6 describes, in a time graph, the operation of the arbitration unit of FIG. 5 when the two clock signals CLK1 and CLK2 have the same period and a predetermined time-phase difference, for example, of 180°.

The graphs CLK1, CLK2, R, GL and M represent the clock signals, the state of the requests output by the input register, the state of the grant signals output by the output register, and the state of the masking configuration output by the mask generators.

At the time t0, a request Ri asserted before t0 is latched as a high-priority request.

In the time interval t0–t1, the arbitration is carried out and, at the time t1, the grant signal GLi is loaded in the output register. This signal, which is sent to the requesting unit i, enables the request Ri to be deasserted. This necessarily has to take place before a new set of requests is loaded in the input register at the time t2.

At the time t2 (more precisely with a delay due to the set-up time of the flip-flops 53, 54, 55) the mask configuration Mi resulting from the arbitration carried out is generated.

In the time interval t2–t3 a second arbitration is carried out and is subordinated to the mask configuration Mi: this second arbitration affirms the grant signal GLj at the time t3 in response to a priority request Rj stabilized in the input register at the time t2.

Clearly, at the time t3, a new mask configuration Mj is generated and the process is repeated indefinitely.

It can be seen that the generation of the masks Mi, Mj can be advanced in time to the times t1, t3, respectively; for this purpose, it suffices, with reference again to FIG. 5, to apply as inputs to the OR gates 56, 57, 58, 59 of the circuits 43, instead of the signals GL4, GL3, GL2, GL1 output by the register 41, the pairs of signals G4M and G4, G3M and G3, G2M and G2, and the signal G1, all of which are output by the arbitration network, an OR gate also being provided, with its output connected to the input J of the flip-flop 55 in order to apply the pair of signals G2M, G2 to the input of the latter.

The same effect can be achieved by the application of the negated signals GL4, GL3, GL2 (available without delays at negated outputs of the register 41) as inputs to the AND gate 47, to the AND gates 47, 48, and to the AND gates 47, 48, 49, of the masking circuits 42, respectively, to advance the round-robin masking.

In the embodiment described, the arbitration process comprises an arbitration stage (time interval t0–t1) and a response stage (time interval t1–t2).

The two stages do not overlap in time and no auto-masking and/or collective-masking circuits are required in addition to the masking circuits which define the circular priority.

Figure 7:
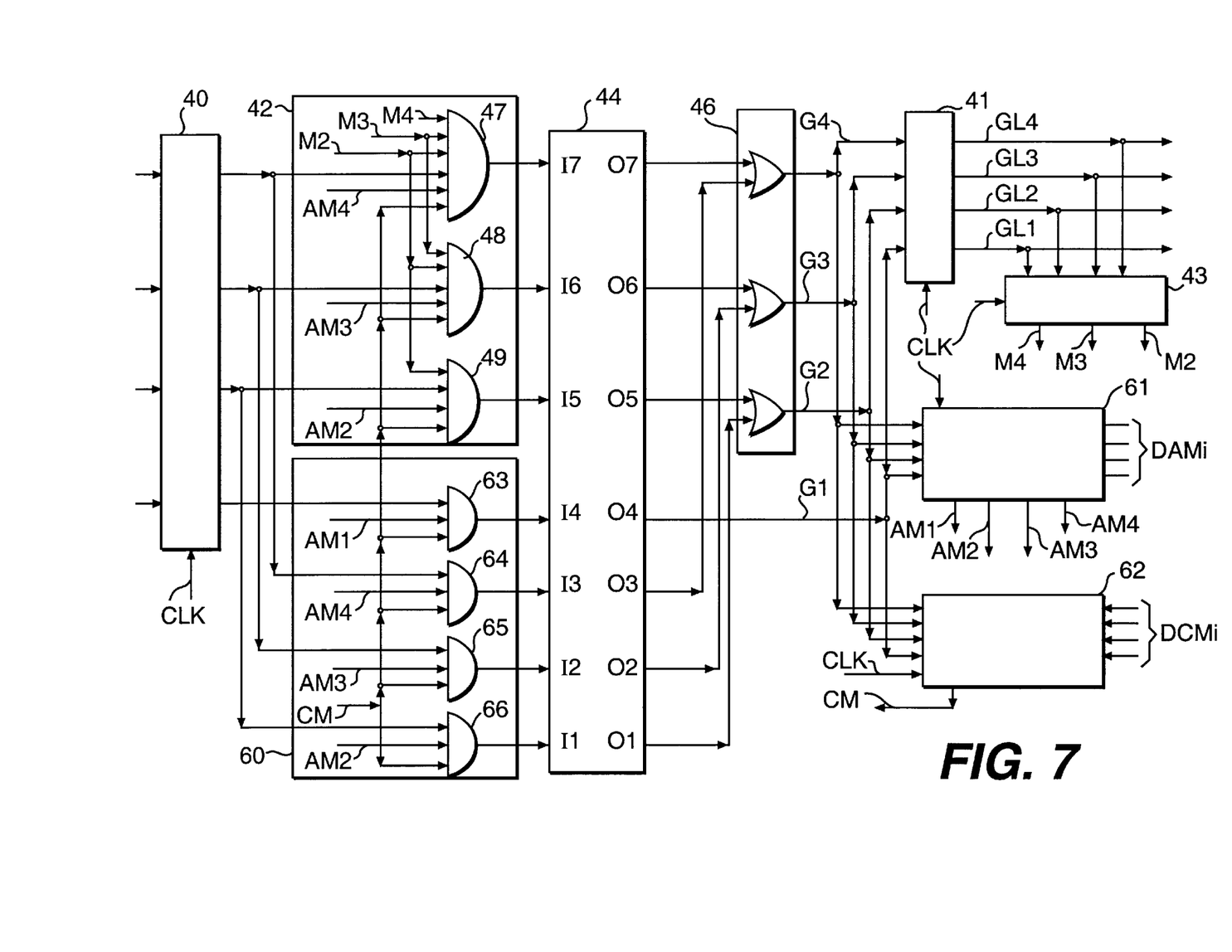
FIG. 7 shows a variant of the embodiment of FIG. 5.

FIG. 7 shows a variant of the arbitration unit of FIG. 5, which is timed by only one clock signal CLK and can operate in a manner such that the arbitration and response stages can overlap in time.

Moreover, the unit can be programmed to adapt to different timing requirements imposed by different types of requesting units which may have either different response times to a grant of access or different tenures.

In FIG. 7, elements functionally equivalent to those of FIG. 5 are identified by the same reference numerals and are not described in detail.

As shown in FIG. 7, in addition to the functional blocks 40, 41, 42, 43, 44, 46 already considered in FIG. 5, there are masking circuits 60 for masking with an auto-mask and/or with a collective mask the requests applied to the inputs I1, I2, I3, I4 of the arbitration network, auto-mask-generating logic means 61 and collective-mask-generating logic means 62.

Like the masking circuits 42, the masking circuits 60 comprise N=4 AND gates 63, 64, 65, 66 with outputs connected to the inputs I4, I3, I2, I1, of the arbitration network 44, respectively.

The AND gate 63 receives as inputs the request R1 output from the register 40, an auto-mask signal AM1 generated by the logic means 61 and a collective-mask signal CM generated by the logic means 62.

The AND gate 64 receives as inputs the request R4 output from the register 40, an auto-mask signal AM4, generated by the logic means 61 and the collective-mask signal CM.

The AND gate 65 receives as inputs the request R3 output by the register 40, an auto-mask signal AM3 generated by the logic means 61 and the collective-mask signal CM.

Finally, the AND gate 66 receives as inputs the request R2 output by the register 40, an auto-mask signal AM2, generated by the logic circuits 61 and the collective-mask signal CM.

The auto-mask signals AM4, AM3, AM2 are also applied as inputs to the AND gates 47, 48, 49 of the masking circuits 42, respectively.

The collective mask signal is also applied to the AND gates 47, 48, 49.

The logic means 61 consist essentially of a synchronous finite-state machine which is timed by the clock signal CLK and receives as inputs the signals G4, G3, G2 output by the set of OR gates 46 (if timing requirements require it, the signals G4, G3, G2 may be replaced by the corresponding signals present at the outputs O7, O3, O6, O2, O5, O1 of the arbitration network 44) and the signal G1 output by the arbitration network 44.

It also receives, at control inputs DAMi, a set of signals which program the operation of the state machine and define the durations in periods of the clock signal CLK of the various auto-mask signals AM1, AM2, AM3, AM4 generated by the state machine.

It should be noted that the durations of the various auto-mask signals can be programmed individually for the various requests; in fact, the requesting units may have different response times in cancelling their requests in response to a grant signal sent to them.

In addition to the internal response times which may differ, the distance between the requesting unit and the arbitration unit has a decisive role in defining the response time; the greater the lengths of the electrical connections between the requesting unit and the arbitration unit, the greater the delay in the propagation of the assertion edge of the grant signal from the arbitration unit to the requesting unit and the delay in the propagation of the cancellation edge of the request signal from the requesting unit to the arbitration unit.

The logic means 62 also consist essentially of a synchronous state machine which is timed by the clock signal CLK and receives as inputs the signals G4, G3, G2 output by the set of OR gates 46 (or the corresponding signals output by the arbitration network 44) and the signal G1 output by the arbitration network 44.

It also receives, at control inputs DCMi, a set of signals which program the operation of the state machine and define the durations, in periods of the clock signal CLK, of the collective-mask signal CM generated by the state machine.

In this case also, the duration of the collective-mask may vary with the type of requesting unit served.

The duration of the collective mask is determined essentially by the resource tenure of the requesting unit to which access to the common resources is granted.

The tenures of the various requesting units are defined by the input signals DCMi received.

Clearly the distinction between the state machine 61 and the state machine 62, like the distinction between the auto-mask signal and the collective-mask signal, is purely functional; in practice the two state machines may consist of a single machine and may generate mask signals which are themselves the OR logic product of a collective-mask signal and auto-mask signals.

The same consideration applies to the round-robin mask-generating circuits 43 which may also be combined in a single state machine for generating mask signals having the various round-robin, collective and auto-mask masking functions.

Figure 8:
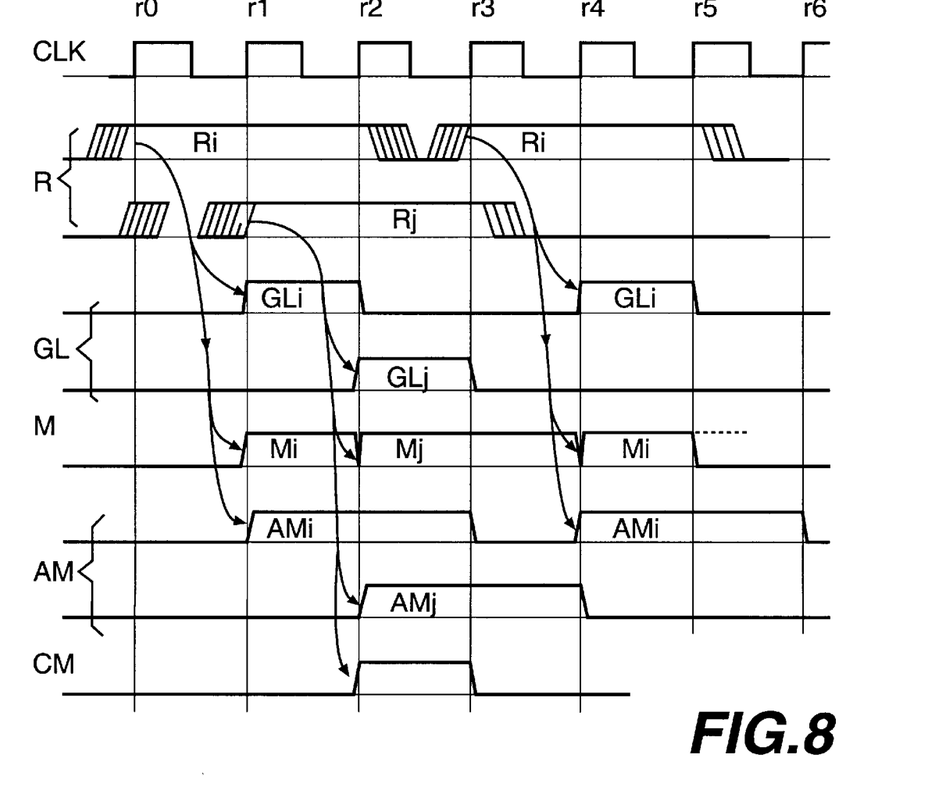
FIG. 8 shows the operation of the arbitration unit of FIG. 7 in a time graph.

FIG. 8 shows, in a time graph, the arbitration process carried out by the unit of FIG. 7.

The graphs CLK, R, GL, AM, CM and M represent the clock signal CLK, the state of the requests output by the input register 40, the grant signals output by the output register 41, the auto-masks generated by the state machine 61, the collective mask generated by the state machine 62 and the round-robin mask generated by the mask-generating circuits 43 in order to rotate the relative priorities of the requests.

For uniformity of representation and description, the mask signals are considered logically asserted if they are active, regardless of their actual electrical level.

The same consideration applies to the request and grant signals.

The arrows which extend from one graph to another indicate the connection of the various signals.

At an initial time t0 the input register 40 has at its output a set of asserted requests (or even a single request) of which the request Ri has highest priority.

By way of example, it is assumed that the requesting unit "i" has a response time for the deassertion of its request Ri equal to two periods of the clock signal CLK and a tenure of the resources equal to a single period of the clock signal CLK.

In the time interval t0–t1, the arbitration unit arbitrates between the various requests and at the time t1, asserts the grant signal GLi at its output in response to the request Ri.

At the same time, the round-robin mask Mi which masks all of the requests for access with an initial priority or rank$\geq$i (if i>1) is made available at the inputs of the masking circuits 42 and the auto-miask AMi is made available at the inputs both of the masking circuits 42 and of the masking circuits 60.

Upon the hypothesis made, that the tenure is a single period of the clock signal CLK, it is not necessary to affirm the collective mask.

At the time t1 a new set of requests including Ri is loaded in the input register and a new arbitration stage takes place with the priorities of the various requests subordinated to the presence of the round-robin mask Mi and the auto-mask AMi.

The auto-mask AMi prevents the request Ri from being taken into consideration for a second time in the course of this arbitration, even if there are no other requests.

If, at this stage, a request Rj has the highest priority, at the time t2, the grant signal GLj is asserted at the output and a new round-robin mask Mj is generated to replace the mask Mi.

It should be noted that even in the absence of other requests, the auto-mask AMi causes the deassertion of GLi at the time t2.

At the time t2, the requesting unit "i" recognizes the asserted signal GLi (to which the time interval t1–t2 is available for its propagation from the arbitration unit to the requesting unit) and deasserts the request Ri (which may be propagated from the requesting unit to the arbitration unit during the time interval t2–t3).

Clearly, therefore, the affirmed request Ri remains latched in the input register throughout the time interval t2–t3.

However, the auto-mask AMi which is output by the states machine 61 and asserted throughout the necessary time (in the example, two CLK periods) prevents the request Ri which is still latched in the asserted state in the input register from being taken into consideration in the course of any arbitration carried out in the interval t2–t3.

Moreover, in the time interval t2–t3, if the mask Mi is not replaced by a new round robin mask it subordinates the arbitration priority to the outcome of the arbitration carried out in the time interval t0–t1 if no request for service has been recognized in the time interval t1–t2 and, at the time t2, the grant signal GLj and the corresponding round robin mask Mj have thus not been affirmed.

The arbitration carried out in the time interval t2–t3 may also be subordinated to the presence of a collective mask signal.

For example, it may be assumed that the request Rj which is arbitrated and recognized as having priority in the time interval t1–t2 is presented by a requesting unit which has both a response time and a resource tenure which are equal to two periods of the clock signal CLK.

In this case, at the time t2 not only GLj but also the masks Mj, AMj and CM are asserted.

Since, in the interval t2–t3, all possible requests are masked, it is as if no arbitration took place in this interval.

At the time t3, the grant signal GLj, which is asserted from the time t2, is recognized by the requesting unit "j"

which, in the following period, cancels the request Rj and during the two following periods (interval t3–t5) occupies the common resources.

At the time t3, the collective mask signal CM is deasserted and, in the time interval t3–t4, a new arbitration can therefore take place, in which the requesting unit "j" does not participate since, although Rj is still asserted, it is masked by the auto-mask AMj.

It should be noted that the requesting unit "i" can, on the other hand, participate if Ri is asserted again (or if Ri has remained asserted) since the auto-mask AMi is cancelled at the time t2 in this new arbitration.

The grant of the common resources to a new requesting unit, for example, the unit "i" again, at the time t4 does not interfere with the occupied state of the resources (which are occupied by the unit "j" in the interval t3–t5) since the asserted signal GLi is recognized by the unit "i" at the time t5 and the common resources are occupied in the time interval t5–t6, after they have been released by the unit "j".

Finally, an arbitration phase may take place for each period of the clock signal CLK and the arbitrations carried out subsequently conform to the circular priority criterion.

At the same time, in the course of an arbitration phase, a response phase resulting from the arbitration carried out previously takes place with an at least partial overlap.

Clearly, many other variations may be applied, in addition to those described in the course of the foregoing description, in order to adapt the arbitration unit described to specific requirements.

For example, two arbitration units of the type described may be combined and may have in common the input register, the output register and the input OR gates for the output register (and possibly also circuits for generating the various masks) to form an arbitration unit with two hierarchical levels equivalent to that of FIG. 2 for a fixed-priority arbitrator, without any resulting increase in the arbitration time.

I claim:

1. A synchronous round-robin arbitration unit for arbitrating between N requests for access to common resources of a multiprocessor system generated by N requesting units and for granting access to one requesting unit at a time, comprising:

an input register timed by a first periodic clock signal for loading the N requests at each periodic signal received, a fixed-priority arbitration network having 2N−1 inputs for receiving and arbitrating between 2N−1 signals, the network assigning to each of the inputs and to the corresponding signal applied, an ordered and invariable priority K where (2N−1)≧K≧1, relative to the other inputs, the 2N−1 inputs comprising a first set of N−1 lower-priority inputs, a second set of N−1 higher-priority inputs and an input of priority K=N intermediate those of the first and second sets, the network having 2N−1 outputs, each associated with one of the inputs and with the corresponding signal applied to assert one of 2N−1 access grant signals at one of the outputs, as a result of an arbitration carried out, first means for applying, as an input to the first set of inputs and to the input with intermediate priority, the N requests loaded in the input register, second means for applying, as an input to the second set of inputs, the same N−1 requests which are applied as inputs to the first set of inputs, in the same order of priority relative to the inputs, the second means comprising masking logic circuits for selectively masking, in dependence on a binary round-robin masking configuration, the N−1 requests applied as inputs to the second set of inputs, OR logic means for each pair of outputs of the network, associated with pairs of inputs of the network to which the same request is applied, an output register timed by a second periodic clock signal for holding, for each period of the second clock signal, the grant signals output by the OR logic means and the grant signal presented at the output of the network associated with the input of intermediate priority, and mask-generating circuits for generating, in response to an arbitration carried out by the network, a binary rotating-priority masking configuration in order selectively to mask the requests applied to the inputs of the second set in accordance with a predetermined rotating-priority criterion.

2. An arbitration unit according to claim 1, in which the first and second clock signals coincide in a common clock signal.

3. An arbitration unit according to claim 1, in which the mask-generating circuits generate, in response to each arbitration carried out by the network which results in the assertion of a grant signal, a rotating-priority masking configuration which increases the number of the masked requests applied as inputs to the second set which have priorities decreasing in order from the highest, if the number of requests previously masked is less than N−1 and which does not mask any request if the number of requests previously masked is equal to N−1.

4. An arbitration unit according to claim 3, in which the first and second clock signals coincide in a common clock signal.

5. An arbitration unit according to claim 1, in which the mask-generating circuits generate, in response to an arbitration carried out by the network which results in the assertion of a grant signal associated with an input with assigned priority K, a rotating-priority masking configuration which masks the requests applied to the inputs of the second set having priorities ≧K if K>N and having priorities ≧K+N if K<N, and which does not mask any request if K=N.

6. An arbitration unit according to claims 5, in which the first and second clock signals coincide in a common clock signal.

7. An arbitration unit according to claim 6, comprising auto-mask-generating means which, for each assertion of a grant signal in response to a request, mask the request at least during the period of the common clock signal in which the grant signal is asserted.

8. An arbitration unit according to claim 6, comprising collective masking means which, for an arbitration of the network which results in the assertion of a grant signal, mask, during the period of the common clock signal immediately following the assertion, all of the requests applied as inputs to the network.

9. An arbitration unit according to claim 8, comprising auto-mask-generating means which, for each assertion of a grant signal in response to a request, mask the request at least during the period of the common clock signal in which the grant signal is asserted.

10. An arbitration unit according to claim 8, in which the collective masking means can be programmed to mask all of the requests applied as inputs to the network for a programmable number of periods of the common clock signal immediately following the assertion.

11. An arbitration unit according to claim 10, comprising auto-mask-generating means which, for each assertion of a grant signal in response to a request, mask the request at least during the period of the common clock signal in which the grant signal is asserted.

12. An arbitration unit according to claim 11, in which the auto-mask-generating means can be programmed to mask the request for a number of periods of the clock signal which depends upon the requesting unit giving rise to the request.

* * * * *

UNITED STATES PATENT AND TRADEMARK OFFICE
CERTIFICATE OF CORRECTION

PATENT NO. : 5,870,560
DATED : February 9, 1999
INVENTOR : Ferruccio ZULIAN

It is certified that error appears in the above-identified patent and that said Letters Patent is hereby corrected as shown below:

Title Page, Item [54], in the Title, Line 1, change "Arbitraion" to --Arbitration--.

Title Page, Item [54], in the Title, Line 4, change "Syncronous" to --Synchronous--.

Signed and Sealed this

Tenth Day of August, 1999

Attest:

Attesting Officer

Q. TODD DICKINSON

Acting Commissioner of Patents and Trademarks